July 22, 1969     B. Q. BARRINGTON ET AL     3,456,726
WELL TESTER FOR MAKING DUAL MEASUREMENTS OF CLOSED-IN WELL
PRESSURE AND ENTRAPPING A WELL FLUID SAMPLE
Filed Feb. 21, 1968     3 Sheets-Sheet 1

INVENTORS
BURCHUS Q. BARRINGTON
ARNOLD G. EDWARDS

BY   Burns, Doane, Benedict, Swecker & Mathis

ATTORNEYS

United States Patent Office 3,456,726
Patented July 22, 1969

3,456,726
WELL TESTER FOR MAKING DUAL MEASUREMENTS OF CLOSED-IN WELL PRESSURE AND ENTRAPPING A WELL FLUID SAMPLE
Burchus Q. Barrington and Arnold G. Edwards, Duncan, Okla., assignors to Halliburton Company, Duncan, Okla., a corporation of Delaware
Filed Feb. 21, 1968, Ser. No. 707,232
Int. Cl. E21b 27/00, 33/124
U.S. Cl. 166—162                10 Claims

ABSTRACT OF THE DISCLOSURE

A fluid sampling apparatus including a cylinder, a mandrel movably mounted within the cylinder, rotary operating means for moving the mandrel axially of the cylinder, and wall means defining a sample chamber between the mandrel and cylinder. Control means operable in response to mandrel movement, serve to selectively and sequentially open and close a flow path extending through the sample chamber.

---

This invention relates to apparatus for testing properties of well fluids. More particularly, it relates to an apparatus operable, in response to rotation of a well string, to obtain two sequential measurements of formation pressure, with the well "closed in." The apparatus also includes a unique sample chamber operable to entrap and seal a sample of formation fluid.

General background of the invention

The well testing art is replete with structures designed to yield accurate information concerning properties of well fluids. Many such testing tools are designed for specific applications where certain operating parameters must be met.

In some testing environments, it is not desirable for the testing tool to be manipulated in response to axial movement of the conduit string which supports the testing tool. Although such linear movements afford a simplification of tester tool manipulations, they also introduce a vulnerability to inadvertent tester tool operation, resulting from accidental or improperly controlled linear movement of the conduit string.

Also of concern in the testing tool art, is the handling of well fluid as it moves from a well annulus into a sampe chamber where a sample of the well fluid would be entrapped. It is desirable to insure that fluid moving into the sample chamber is entrapped under pressure conditions accurately reflecting the pressure of the flowing fluid prior to its entrapment. It is equally desirable that the fluid, in flowing into the sample chamber, retain the phase relationship which characterizes it as it approaches the chamber, i.e., a phase relationship as near to formation conditions as possible.

It is also desirable to obtain a system for repeatedly manipulating a valve which controls fluid flow through a sample chamber without subjecting the conduit string to manipulations which would tend to separate threaded sections of the string.

While discharging a well fluid sample from its entrapped condition within a sample chamber, it is important to consider the safety of the operator involved in the sample removal operation. Thus, this safety could be enhanced by displacing the point where the operator effects manipulations to release a sample and the point where the high pressure sample actually exits from the sample chamber.

Taking into consideration the composite character of well fluids, which may include suspended solid material, it is desirable to provide a valve or control mechanism for the sample chamber which is virtually fool proof in operation and reasonably resistant to clogging tendencies.

In testing tools, sample fluids entering passages leading to a sample chamber are characterized by high pressure and a relatively high flow velocity. Obviously, it is desirable to avoid subjecting movable control components of the testing tool to these high pressures and velocities which might tend to impede manipulations of the components.

Objects and summary of invention

Recognizing the need for a tester tool satisfying the desirable objectives previously delineated, it is an object of this invention to provide a novel well testing apparatus including improved structured designed to provide each of the desirable operating features above enumerated.

It is a principal object of the invention to provide an improved tester tool characterized by a combination including a rotary operating mechanism, which prevents inadvertent tester tool operation in response to axial force imposed on a conduit string supporting the tester tool, and a mandrel and cylinder structure which serves to entrap an annular sample of flowing well fluid.

It is another principal object of the invention to provide an improved sample entrapping chamber structure characterized by a staged, fluid inlet which tends to prevent phase separation of a sample as it goes from a restricted annulus into an enlarged sample chamber.

It is likewise an object of the invention to provide a unique, sample discharging arrangement which functions to provide a shield interposed partially between a sample release, valve structure and a sample exiting port.

It is also an object of the invention to provide a sequentially operable control system for obtaining repeated measurements of the pressure of interrupted and uninterrupted flows of the well fluid, without tending to impose force on a testing tool supporting string which would tend to separate or unscrew sections of this string.

Another object of the invention is to provide a specific arrangement of ports and recesses which cooperate to minimize the possibility of tool clogging and facilitate the overall operation of the tool.

It is likewise an object of the invention to provide such an improved control structure which enables a sample fluid to be entrapped under pressure conditions accurately reflecting the pressure of the flowing well fluid.

Yet another object of the invention is to provide an improved tester tool including means for effectively shielding operating components from the velocity and high pressure of well fluids approaching a sample chamber.

In accomplishing some of the foregoing objects, there is presented through this invention a well fluid sampling apparatus including cylinder means and mandrel means movably mounted within the cylinder means. A rotary operating means is adapted to be connected to a conduit string and is operable in response to rotation of this conduit string to induce axial movement of the mandrel means within the cylinder means. Wall means define an annular sample chamber interposed radially between the cylinder means and the mandrel means. This sample chamber has upper and lower ends when the apparatus is disposed in a vertical well.

A first passage means, disposed beneath the annular sample chamber, is adapted to communicate with the sample chamber and with well fluid. A second passage means, disposed above the sample chamber, is adapted to communicate with the sample chamber and the interior of the conduit string which supports the apparatus.

A control means is operable in response to a first axial positioning of the mandrel means, at a first position within the cylinder means, to permit a flow of well fluid from the first passage means, through the annular sample chamber, and into the second passage means. An additional control means is operable in response to another positioning of the mandrel means, at another position within the cylinder means, to block fluid flow from the first passage means through the annular sample chamber and into the second passage means and to seal the upper and lower ends of the annular sample chamber and entrap well fluid therebetween.

Additionally, significant facets of the invention, in the context of this basic structural environment, reside in a structure for sealing the mandrel from the flow of well fluid entering the sample chamber, in structural details of the control means involving a specific and unique arrangement of ports and annular recesses, in a uniquely "stepped" sample chamber designed to minimize phase separation of the sample fluid, in a sample chamber including one wall which is rotatable relative to another wall, and in a unique sample chamber outlet arrangement which serves to at least partially shield an operator from the location of discharging well fluid.

The stepped sample chamber and the improved sample outlet structure constitute independently significant facets of the invention.

Drawings of preferred embodiment

In describing the invention, reference will be made to a preferred embodiment shown in the appended drawings.

In the drawings:

FIGURES 3 and 4 illustrate a portion of the tool immediately adjacent the FIGURE 2 portion, it being understood that FIGURES 3 and 4, if at the same scale as FIGURE 2, would illustrate a tool portion joined to the FIGURE 2 tool portion along the connecting line B—B;

FIGURES 7a, b, c and d, schematically illustrate, in sequential arrangement, the position of components of the FIGURE 1 tester tool designed to permit, in sequence, opening, closing, opening, and final closing of the sample chamber.

Context of invention

Figure 1:
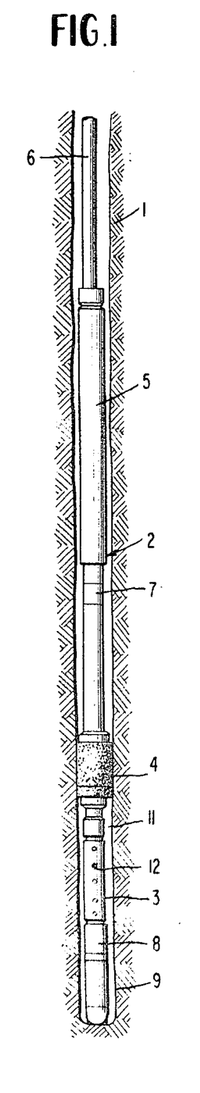
FIGURE 1 schematically illustrates a conduit string disposed in a well bore and supporting the tester tool of the present invention.

FIGURE 1 schematically illustrates, in vertical cross section, a well bore 1. A testing string 2 is supported within this well bore.

Testing string 2 includes a perforate anchor pipe 3, a packer 4, and a flow controlling and fluid sample entrapping, sampler unit 5. A conventional conduit string 6, made up of threadedly interconnected conduit joints, extends upwardly from the supports the sampler 5, packer 4 and anchor pipe 3.

A conventional pressure recorder 7 may be interposed within the string 2 between the flow passage of the anchor pipe 3 and the sampler unit 5. Another conventional pressure recorder may be incorporated in the lower end of the string 2, as shown in FIGURE 1, in continuous and virtually free fluid communication with the well annulus 9.

The disposition and significance of the two recording units 7 and 8 within the testing string 2 is recognized in the art and discussed, for example, in the United States Ayers et al. Patent 3,103,811 and in an article entitled "Status of Drill-Stream Testing Techniques and Analysis" appearing at page 333 of the April 1961 issue of the Journal of Petroleum Technology.

This assembly of elements, in the usual field installation, will include additional components such as a safety joint, a jarring tool, an equalizing valve to prevent undesired pressure buildups in the annulus beneath the packer 4. Structural details of these units, as well as structural details of the anchor pipe 3, packer 4, and recorders 8 and 9 are well known and vary substantially, depending upon manufacturing sources.

An effective assembly of components in a testing tool is illustrated, by way of example, at page 129 of the 1961 issue of the Halliburton Sales and Service Catalog. Structural details of these conventional components, and their overall mode of operation being well known, their description is here omitted so as to avoid obscuring the significant novel aspects of the sample unit 5.

Suffice it to here say, in order to delineate the context of the invention, that the testing string 2 is supported on conduit string 6 and lowered on string 6 into the well 1 by conventional hoisting means positioned at a well head, not shown.

The assembly may be lowered until its lower end comes to rest on the bottom of the well as shown in FIGURE 1. Subsequently, by appropriate manipulations of the supporting string 6, the packer 4 is radially expanded from an initial contracted position into sealing engagement with the wall 10 of the well bore. This sealing isolates an annular zone 11 beneath the expanded packer 4 from the remainder of the well bore. Annulus 11 communicates with a formation, the fluid properties of which are to be tested. Generally, this formation will lie radially adjacent the perforate anchor pipe 3.

Fluid from the formation will flow into the annulus 11 and then through the perforations 12 of the anchor pipe into passage means extending longitudinally of the entire tester string 2 and communicating with the hollow interior of the supporting string 6. It will be understood, of course, that fluid flow through this passage means of the tester string 2 will be controlled by valve means incorporated in the sampling unit 5.

The usual formation test will involve measuring the pressure of formation fluids with the recorders of units 7 and 8, with fluid flow through the string passage means being selectively permitted or blocked by valving means within the sampler 5. At the conclusion of the testing operation, a sample of flowing well fluid is isolated, entrapped and sealed within an annular chamber of the sampler 5.

When the string 2 is to be removed from well 1, packer 4 is radially retracted. The testing string is then pulled through the well head by moving the supporting string 6 upwardly. With the sampler 5 located at the well head, the entrapped fluid sampler may be removed and analyzed.

Overall structure of sampler unit

Figure 2:
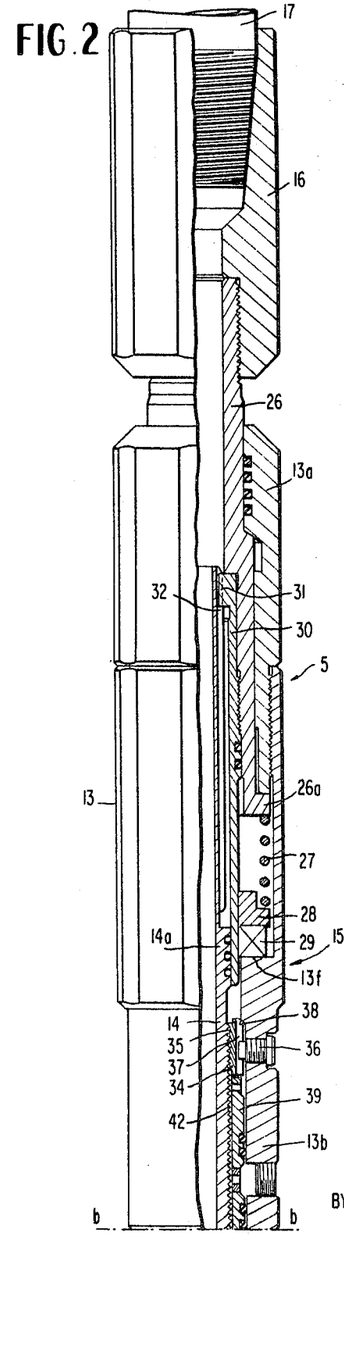
FIGURE 2 illustrates an enlarged, fragmentary, vertically sectional view of an upper portion of the tester tool shown in FIGURE 1 and illustrating structural details of a rotary operating mechanism which serves to effect controlled axial movement of a tool mandrel in response to conduit string rotation.
Figure 3:
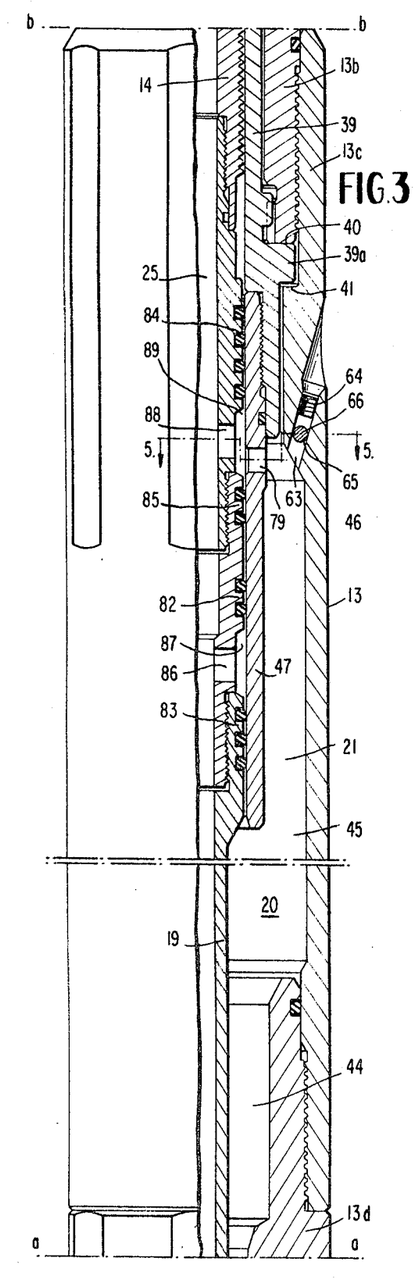
FIGURES 3 and 4, joined along the section line A—A provide a somewhat further enlarged view of another portion of the FIGURE 1 tester tool illustrating structural details of a sample entrapping chamber.
Figure 4:
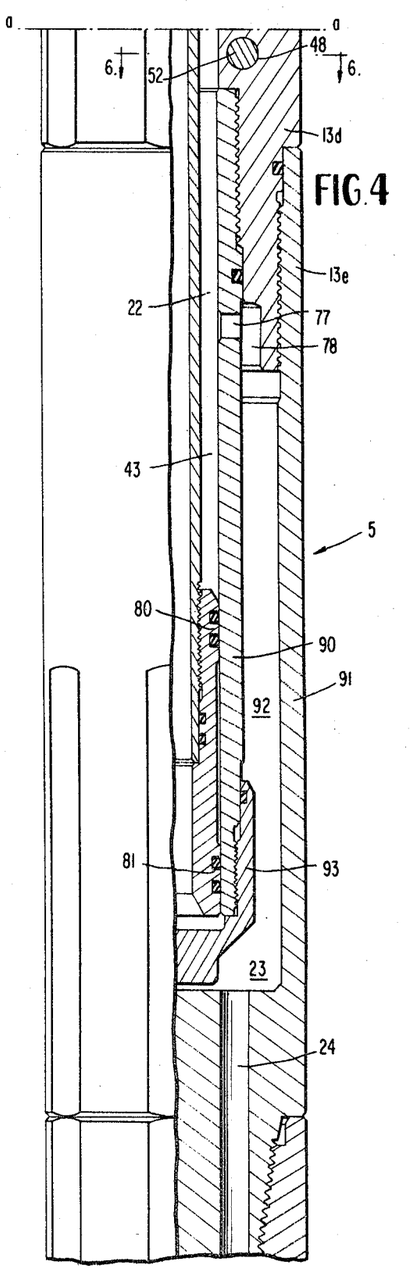

The overall structure of the sampler unit 5 is illustrated in FIGURES 2, 3 and 4.

As there shown, sampler unit 5 includes a cylinder 13 and a mandrel 14 mounted for combined axial and rotary movement within the cylinder 13. A rotary operating mechanism 15 is connected by a threaded coupling 16 to a conduit portion 17. Conduit portion 17, either directly or indirectly, is connected to the supporting string 6 so as to enable the string 6 to support the sampler unit 5 and impart rotary movement to the operating mechanism 15. Rotation of components of the operating mechanism 15, in response to rotation of the conduit string 6, serves to induce axial movement of the mandrel 14 in a manner to be hereinafter described in greater detail.

As shown in FIGURES 3 and 4, a generally cylindrical wall portion 18 of cylinder 13 is spaced radially outwardly from a generally cylindrical wall segment 19 of mandrel 14. The radially spaced wall means 18 and 19 cooperate to define an annular sample chamber 20 interposed radially between the cylinder 13 and mandrel 14. Sample chamber 20 has an upper end 21 and a lower end 22, as shown in FIGURES 3 and 4, respectively.

A first longitudinally extending passage means 23, formed in the lower end of the sampler unit 5, is disposed generally beneath the sample chamber 20. This first passage means 23 is operable to communicate with well fluids, by way of passage portions including the passage portion 24 shown in FIGURE 4 which communicates through the interior of the testing string 2 with the annular zone 11.

A second passage means 25 is disposed above the sample chamber 20 and extends longitudinally upwardly from this chamber. Second passage means 25 is operable to communicate with the upper end 21 of the sample chamber 20 in a manner to be subsequently described. Passage means 25 also communicates through interior passage portions of the string 2 with the interior of the supporting string 6 which extends upwardly to a well head.

A variety of control means, carried by the cylinder 13 and mandrel 14, and subsequently described in detail, serve to selectively control fluid flow from the well annulus 11, consecutively through the intercommunicating passage means 23, sample chamber 20, and passage means 25. These control means, all operable in response to rotation of the supporting string 6, serve to close the upper and lower ends 21 and 22 of the sample chamber 20 so as to isolate and entrap a portion of a fluid stream of well fluid.

The positioning of these control elements, to either permit or block fluid flow through the passage means and sample chamber, is "locked" or fixed so as to enable the control means to be immune to longitudinal forces imposed on the conduit string 6. This locking results from operation of a threaded locking means incorporated in the rotary operating mechanism 15.

Structural details of the rotary operating mechanism 15 including the control locking means will now be described.

Rotary operating and locking means

Rotary operating and locking means 15 includes a spindle 26 journaled in the upper end of a threaded segment 13a of cylinder 13. Spindle 26 is resiliently journaled in segment 13a, and held in place by a coil spring, shock absorbing, mounting arrangement. This spring mechanism provides a shock absorbing structure operable to yieldably absorb axial shock imposed on the spindle 26.

This coil spring mounting arrangement includes a coil spring 27 extending between a ledge 26a on the underside of spindle 26 and a shelf or annular abutment 13f carried by the cylinder segment 13b. A spring end retainer 28, having an L-shaped cross section, and a conventional bearing assembly 29 are interpositioned between the lower end of the spring 27 and the abutment surface 13f.

Spindle 26 carries a sleeve 30 on its inner periphery. Sleeve 30 is provided with a plurality of circumferentially spaced, longitudinally extending and radially, inwardly facing lugs or splines 31.

As a part of operating means 15, mandrel 14 includes an upper segment 14a provided with a plurality of radially, outwardly, facing, circumferentially spaced, and longitudinally extending, grooves 32. Each groove 32 receives a spline 31. Thus grooves 32 and spline ridges 31 cooperate to provide spline joint means interconnecting the mandrel 14 and spindle 26. This spline joint means is operable to enable rotary movement of the spindle 26 to be transmitted to the mandrel 14.

This rotary movement of the mandrel 14 is translated into axial movement of the mandrel by a threaded, locking coupling 33.

Threaded locking coupling 33 includes a nut 34 including a female threaded portion 35 coaxially aligned with the central, longitudinally extending axis of the tester 5. A set screw 36, intersecting the wall of cylinder 13, serves to prevent rotation of the nut 34 by engaging a longitudinally extending slot 37 formed in the nut periphery. Upward movement of the nut 34 is prevented by an annular cylinder shoulder 38. Downward movement of the nut 34 is prevented by the upper end of a lining sleeve 39. Lining sleeve 39, as shown in FIGURES 3 and 4, is locked in position by a radially outwardly facing ridge 39a which is gripped between annular abutments 40 and 41 formed on segments 13b and 13c, respectively, of cylinder 13.

The remainder of the threaded operating means 15 is provided by a male threaded coupling portion 42 formed on the outer periphery of mandrel 14 beneath the grooves 32.

Male threaded coupling 42 threadedly engages the female coupling portion 35. Thus, rotary movement of the mandrel 14 is translated into axial movement of the mandrel 14 within the cylinder 13 as a result of the threaded interaction between coupling portions 35 and 42. The pitch and overall characteristics of the threads of couplings 35 and 42 is such as to insure that the mandrel 14 will not move axially within the cylinder means 13 solely in response to an axial force imposed upon the mandrel 14.

As will be noted, the sleeve 39 functions as a peripheral shield for the male coupling 42. In this way, damage to or clogging of the threads in the coupling 42 is guarded against.

Sample chamber structure

Sample chamber 20 includes a series of progressively enlarged or "stepped," annular zones leading upwardly from the lower end 22 of the sample chamber.

Thus, fluid enters a relatively restricted annular zone 43 formed in the lower end of the chamber 20. This annular zone 43 has a relatively small cross-sectional area.

Fluid flows upwardly from the annular zone 43 directly into a somewhat larger cross-sectioned, intermediate annular zone 44. The cross-sectional area of zone 44 is somewhat larger than that of the lower zone 43.

Fluid from the zone 44 flows upwardly into the relatively large, main sampling receiving zone 45. This third and upper annular zone 45, which communicates with and is immediately contiguous with, the zone 44 has a larger cross-sectional area than that of the intermediate zone 44.

As will be seen by reference to FIGURE 3, the difference in width between the zones 43 and 44 is generally, i.e., more or less, on the same order as the difference in width between the zones 44 and 45.

Fluid flowing upwardly from the large third annular zone 45 flows into a relatively restricted discharge annulus 46. Discharge annulus 46 is shielded from the mandrel 14 by a sleeve 47 projecting downwardly from and carried by the threaded mandrel shielding sleeve 39.

Fluid entering the lower end of the sample chamber 20 thus moves into a relatively restricted zone 43. This mode of transistion, upon entry of the sample fluid into the sample chamber 20, tends to minimize the chances of excessive phase separation which would tend to occur if the sample were discharged immediately into a larger zone such as zone 45. A rapid or sudden expansion of the sample, which might tend to induce excessive phase separation, as the sample moves upwardly into the main portion 45 of the sample zone, is offset or resisted by the staged or progressively enlarged nature of the sample chamber, characterized by the progressively enlarged annular zones 43, 44 and 45.

It will be noted that the inner wall 19 of the sample chamber 20, carried by mandrel 14, is rotary in nature, i.e., it undergoes rotational movement as it moves axially within the cylinder 13. However, outer wall 18 of sample chamber 20 is relatively fixed in position, i.e., it moves neither axially nor rotatably during the sample receiving operation.

Sample outlet passage means

FIGURES 3, 4, 5 and 6 illustrate structural details of passage means which serve to allow a sample entrapped within the chamber 20 to be removed from this chamber at a well head or other surface location.

A first fluid sample passage means 48 is formed in the lower end of the sample chamber 20 in cylinder section 13d. This passage means serves to provide controlled communication between the lower end of the sample chamber 20 and the exterior of the cylinder 13.

Figure 6:
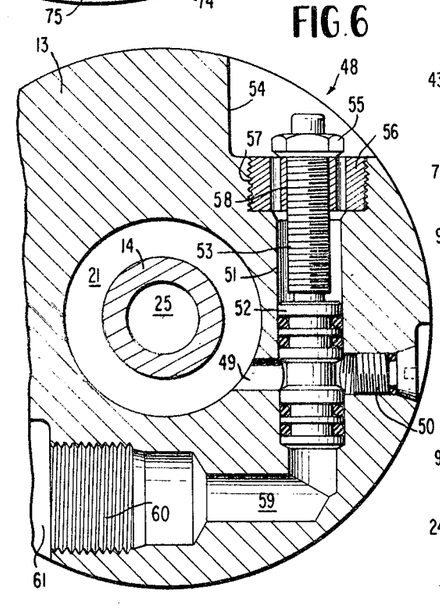
FIGURE 6 provides an enlarged, transverse sectional view of the FIGURE 4 illustration, as viewed along the section line 6—6, and illustrating structural details of a passage arrangement through which a sample fluid may be selectively discharged.

Passage means 48 includes a first passage portion 49 extending generally outwardly of and communicating with the lower end 22 of the sample chamber. Passage portion 48 may be initially fabricated as a bore extending from the sample chamber 20 to the outer periphery of the cylinder 13 as shown in FIGURE 6. The outermost end of the bore 49 is closed by a threaded plug 50. A second passage 51 extends generally perpendicular to the first passage portion 49, and as shown, also extends perpendicular to a radius extending from the center axis of the cylinder 13.

A first spool valve 52 is slidably mounted within the passage 51. Spool valve 52 includes a threaded rod 53 projecting axially to a first zone 54 on the outer periphery of the cylinder 13. The outer extremity of threaed rod 53 in the zone 54 is provided with a polygonally cross-sectioned, tool engageable, head 55. It is contemplated, for example, that head 55 may have a hexagonal cross section, designed to be received within the socket head of a conventional, hexagonal socket wrench.

A nut 56 is threadedly anchored within a bore 57 of the cylinder 13. Nut 56 includes a female threaded portion 58 threadably engaged with the rod 53. Thus, head 55 functions as a first valve operator for spool valve 52 such that rotation of the operator 55, because of the threaded interaction of nut 56 and rod 53, causes axial valving movement of the spool valve 52 within the passage 51.

Nut 56 may be provided with venting passage means 56a. The function of such passage means 56a is to allow air or other fluids, such as well fluids, entrapped in the passage 51 between the spool valve 52 and the nut 56 to move out of the passage 51 without impeding valve movement as the valve 52 is moved toward the nut 56.

A threaded longitudinal passage portion 59 extends at right angles from passage 51 and communicates with the passage 51. Passage 59 has an outlet 60 at a second peripheral location 61 on the outer periphery of the cylinder 13.

As illustrated, locations 54 and 61 are diametrically opposite in their relation. Thus, the curved peripheral portions of the cylinder 13 extending circumferentially between the locations 54 and 61 provide operator shielding means tending to shield an operator at the manipulating site 54 on the outlet 60 of passage 59.

Outlet 60 may be threaded so as to be engageable with a threaded conduit into which the sample is to be discharged.

As will be appreciated, discharging of the sample through the passage means 48 is effected by moving the spool valve 52 away from the passage 59 so as to allow fluid to flow from the sample chamber 20 into the first passage 49 then into the passage 51 and finally into the passage 59. Passage means 48 thus serves as a vehicle for discharging sample liquid from the lower end of the sample chamber.

As shown, passages 51 and 59 are generally aligned with a plane extending perpendicular to the longitudinal or center axis of the cylinder means 13.

Figure 5:
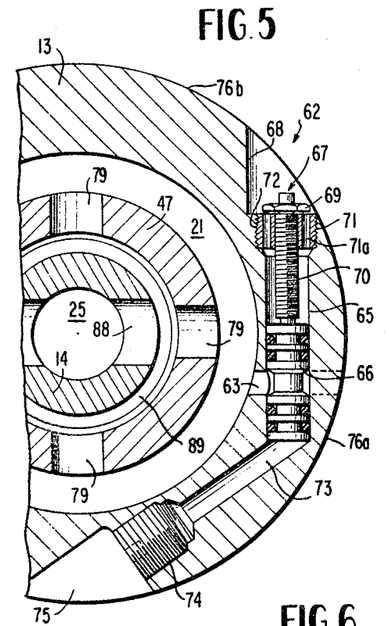
FIGURE 5 illustrates a transverse sectional view of a portion of the FIGURE 3 assembly, illustrating structural details of a passage arrangement for controlling the flow of gas into or out of the sample chamber.

A second sample fluid passage means 62 serves to control the passage of fluid into or out of the upper end 21 of the sample chamber 20. In designating this passage means 62, a "sample fluid" passage means, it will be understood that this terminology is intended to reflect the possibility of outflow of gaseous fluid, as well as the possibility of an inflow of pressurized gaseous or liquid fluid, the function of which would be to displace sample fluid from the sample chamber 20 through the passage means 48.

Passage means 62 includes a fourth passage portion 63 similar to first passage portion 49. Passage 63, as shown in FIGURE 3, is inclined upwardly, and outwardly from, the uppermost end of the sample chamber 20 and intersects the wall of cylinder 13. The outer extremity of the passage 63 is enclosed by a threaded plug 64. Passage means 62 also includes a fifth passage portion 65 identical in function and general structure to passage 51.

A second spool valve 66, substantially the same as spool valve 52, but slightly smaller than spool valve 52, is reciprocally mounted in passage 55. A second valve operating means 67 projects from the valve 66 to a third zone 68 on the outer periphery of cylinder 13. Valve operator 67 may include a hexagonal head 69 integrally connected with a threaded rod 70. This rod is threadably engaged with a nut 71. Threaded nut 71 includes vents 71a, similar to vents 56a, and is threadedly anchored within a recess 72 formed in the cylinder wall 13 adjacent the location 68. Thus, rotation of the hexagonal head 69 serves to effect axial valving movement of the spool valve 66 in exactly the same manner as the rotation of the hexagonal head 55 induces valving movement of the valve 52.

A sixth longitudinal passage portion 73 extends from, and communicates with, the passage 65. Passage 73 has an end 74 terminating at a fourth zone 75 on the outer periphery of cylinder 13. Zones 68 and 75 are circumferentially displaced so as to yield curved peripheral portions 76a and 76b of cylinder 13. The shield portions function as an operator shield interposed at least partially between the operating zone 68 and the passage terminus 74.

As will be apparent, the spool valve 66 is operable to permit or block fluid flow between the sample chamber 20 and the passage terminus 74. The passage terminus 74 may be internally threaded so as to be connectable with a gas-receiving or gas-supplying conduit.

When the passage terminus 74 is connected with a gas-receiving conduit, gas separated from the sample within the zone 20 will flow through the passage means 68 and into the gas-receiving conduit coupled with the threaded passage portion 74. Conversely, gas may be supplied to the passage 73 through the conduit coupled to the terminus 74 so as to provide pressure within the reservoir 20 acting on the top of a liquid sample, contained therein. This pressure may serve to displace the liquid sample through the lower passage means 48.

As illustrated, passage means 65 and 73 are aligned with another plane extending perpendicular to the longitudinal or central axis of cylinder 13. This plane is vertically displaced from the alignment plane of the passages 51 and 59.

Control system for sample chamber and its mode of operation

FIGURES 3 through 6 illustrate structural details of a sequentially operable, compound control system designed to sequentially and repeatedly open and close the sample chamber 20 in relation to the passages 24 and 25.

Figure 7:
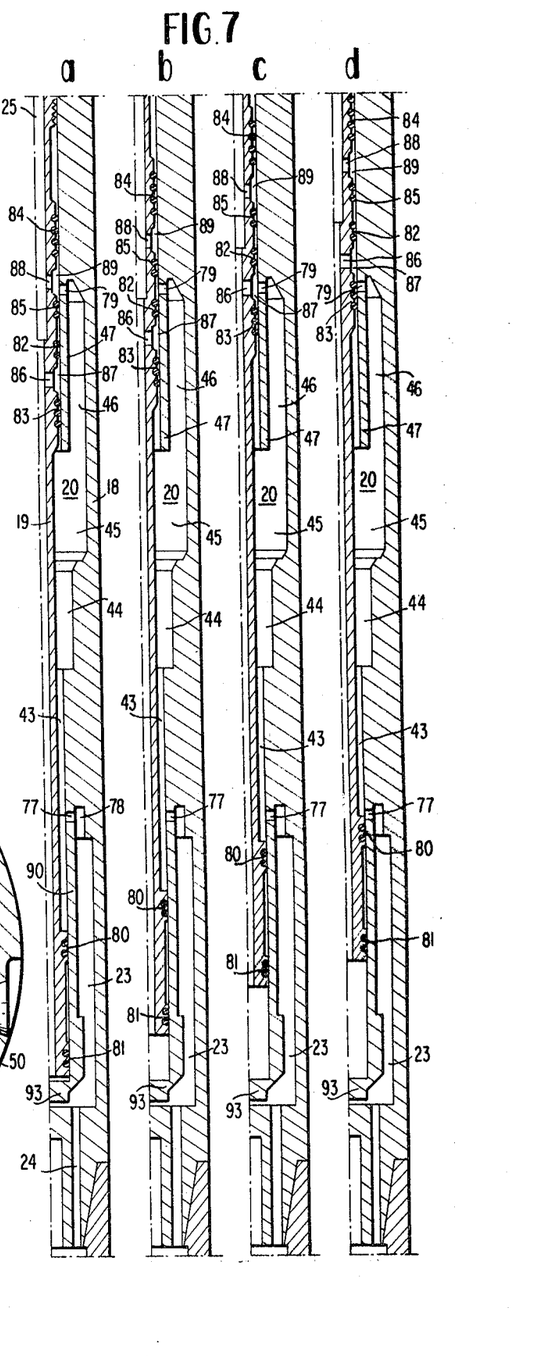
Figure 8:
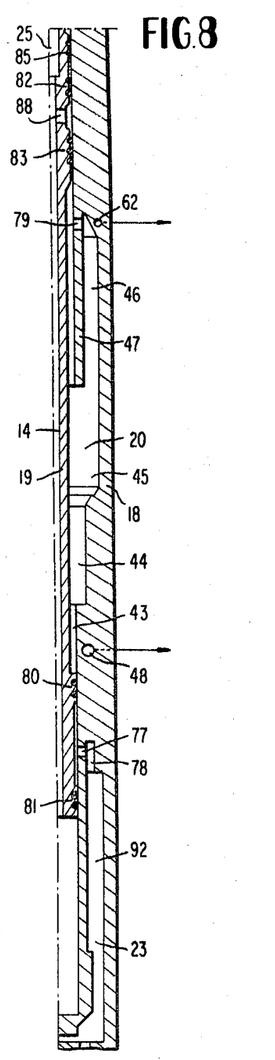
FIGURE 8 schematically illustrates the disposition of tool components operable to close the sample chamber and entrap the sample of fluid therein.

The disposition of elements of this control system, operable to effect different control conditions, is shown in FIGURES 7a through 7d as well as in FIGURE 8, in a schematic format.

The control system includes one or more generally radially extending cylinder ports 77. Each of the ports 77 extends generally radially outwardly from and communicates with the annular zone 43 of the sample chamber 20. Each such port 77 also communicates with an annular cylinder recess 78 which is disposed in contiguous, and communicating alignment, with the passage means 23.

At the upper end of the sample chamber 20, one or more radially extending ports 79 intersect the sleeve 47 and communicate with the upper zone 46 of the sample chamber 20.

In the mandrel 14, at its lower end, a pair of axially spaced seal assemblies 80 and 81 are mounted. Each of these assemblies 80 and 81 comprises one or more O-rings supported in a peripheral groove of the mandrel lower end. The assemblies 81 and 80 are spaced by a distance exceeding the width of the ports 77.

A second pair of annular and O-ring type seal assemblies 82 and 83 is carried by an upper portion of the mandrel 14 in sealing and sliding engagement with the sleeve 47 and its upward continuation defined by the sleeve 39.

A third pair of O-ring seal assemblies 84 and 85 is carried on the mandrel 14 above the seal assemblies 82 and 83. O-ring assemblies 84 and 85 are disposed in slidable and sealing engagement with the sleeve portions 47 and 39.

One or more radially extending ports 86 intersect the wall of mandrel 14 between the seals 82 and 83. Each of these ports 86 intersects an annular recess 87 encircling the outer periphery of the mandrel 14. Thus, each port 86 provides radial communication between the recess 87 and the interior, longitudinally extending passage 25 of tester unit 5. As shown, the seals 82 and 83 are axially spaced a distance exceeding the axial width of the recess 87 and also exceeding the axial width of the ports 79.

One or more radial ports 88 intersects the wall or tubular and generally cylindrical mandrel 14 between the seals 84 and 85. Each of the ports 88 provides fluid communication between the passage 25 and an annular mandrel recess 89. The mandrel recess 89, formed on the outer periphery of the mandrel 14, is disposed between the seals 84 and 85. As shown, the axial spacing of the seals 84 and 85 exceeds the axial width of the parts 88 and 79.

This assembly of ports, seals and mandrel recesses provides a uniquely effective control system providing four separate control positions and operations for controlling fluid flow between the passages 23 and 25 by way of the sample chamber 20.

The first control means, operable in response to the first mandrel positioning shown in FIGURE 7a, includes the port means 77, the port means 79, the recess 89, and the port means 88. By appropriate rotary manipulations of the spindle 26, the mandrel 14 is adjusted to the first mandrel position shown in FIGURE 7a where the port means 77 allows well fluids flowing through the passage means 23 to enter the lower end of the sample chamber. This well fluid may progress upwardly through the sample chamber 20 and flow into the low pressure, exit passage 25 by way of intercommunicating port 79, recess 89, and port 88. By virtue of the annular recesses 89, an operator need not be concerned with a precise rotational positioning of the mandrel 14, i.e., each port 88 need not be rotated into precise radial alignment with the port 79. Indeed, the fact that the axial width of the recess 89 exceeds the width of either port means 79 or port means 88 enables the port means 88 and 79 to even be axially misaligned to some extent, and yet permit fluid to flow out of the sample chamber 20 into the passage 25.

By appropriate manipulations of the spindle 26, i.e., by imparting a predetermined number of rotations to the spindle 26, the mandrel 14 is moved upwardly to the second mandrel position shown in FIGURE 7b.

In this second mandrel position, second control means serve to prevent fluid from flowing from the passage 23 through the sample chamber 20 and into the passage 25.

This second control means includes first seal means defined by seal assemblies 82 and 85. These assemblies serve to isolate port 79 from either the recess 89 or the recess 87. Thus, even though the port means 77 would allow well fluid to flow into the sample chamber 20 as shown in FIGURE 7b, the seal means 82 and 85 block an outflow of well fluid from the sample chamber 20 into the passage means 25.

Third control means serve to again allow fluid to flow from the passage means 23 through the sample chamber 20 and into the passage means 25 in response to continued rotary movement of the spindle 26. This continued rotation serves to further elevate the mandrel 14 within the cylinder 13 to the third control position shown in FIGURE 7c.

This third control means includes the recess 87 and the port means 86. With the mandrel disposed as shown in FIGURE 7c, the recess 87 provides fluid communication between the ports 79 and 87, thereby again permitting an outflow of well fluid from the sample chamber 20. As will be apparent by reference to the lower end of FIGURE 7c, port means 77 continues to allow an inflow of well fluid into the sample chamber 20. The axial dimensioning of recesses 87 enables the ports 79 and 87 to be in effective fluid communication even if there is no radial alignment between these port means, and even though there is some axial misalignment of these port means.

Fourth control means serve to again block fluid flow from the passage 23 through the sample chamber 20 and into the passage 25. This fourth control means includes seal means comprising seal units 83 and 82, and additional seal means comprising the seal units 80 and 81.

As shown in FIGURE 7d, continued upward movement of the mandrel 14 serves to first cause the seal means 83 to close the radially inwardly facing portion of the port 79 so as to block the flow of fluid between the upper end of the sample chamber 20 and the passage 25. This blocking of the upper end of the sample chamber is effected while the port 77 continues to provide fluid communication between the chamber 20 and the passage 23 as shown in FIGURE 7d.

Still further continued uuward movement of the mandrel 14 brings the mandrel to the fourth or uppermost control position shown in FIGURE 8 where a sample well fluid is isolated and trapped within the sample chamber 20. In this fourth and final control position, the seal means 83 is effectively interposed axially between the port means 79 and port means 86 so as to close and seal the upper end of the sample chamber. The seal units 80 and 81 are disposed on opposite sides of the port 77 so as to close the port 77 and thus seal the lower end of the sample chamber. Port 77 is closed after port 79 as a result of the axial distance between these ports being less than the axial distance between seals 83 and 80.

By closing the upper end of the sample chamber prior to closing the lower end, reasonable assurance is provided that the entrapped sample is closed off from the flowing well stream under flowing pressure conditions. The threaded locking action of the coupling portions 35 and 42 serves to lock the mandrel in the FIGURE 8 position so as to "lock" the sealed condition of the sample chamber and prevent opening of the sample chamber in response to inadvertent, purely axial, force operating against the mandrel 14.

As will be further appreciated, each of the first, second, third, and fourth control means is sequentially operable in response to the progressively upwardly displaced positions of the mandrel within the cylinder 14 as reflected in FIGURES 7a, 7b, 7c and 8, respectively. Thus, it is not necessary to impose reverse rotation on the spindle 26 in order to effect repeated opening and closing of the sample chamber. Such reverse rotation would have a tendency, in one direction of rotation, to tend to unthread or uncouple threaded sections of either the testing string 2 or the supporting string 6.

Shielding of mandrel from velocity and pressure of well stream

FIGURE 4 illustrates structural details of an arrangement for effectively shielding the mandrel 14 from the deleterious pressure and velocity effects of the well fluid flowing upwardly to the zone of the port means 77. This shielding structure comprises a cylindrical sleeve-like shield 90 threadably attached to a radially inset portion of cylinder 13. Shield 90 which supports port means 77, is disposed in slidable and sealing engagement with the lower end of mandrel 14 bearing the sealing assemblies 81 and 80. Cylindrical shield 90 is spaced radially inwardly from wall portion 91 of segment 13e of cylinder 13 so as to define an annular passage portion 92 of passage means 23 providing fluid communication between passage 24 and annular recess 78.

A threaded cap-like structure 93 is threadably and detachably connected to the lower end of shield 90 so as to close and seal the lower end of this cylindrical shield. In this manner, the cap 93 and shield 90 cooperate to telescopingly receive the lower end of the mandrel 14 and shield this lower mandrel end from the pressure and velocity effects of the rising well fluid stream flowing through the passage portion 92.

Summary of advantages and scope of invention

A prime advantage of the invention resides in the combination of the annular sample trapping chamber and the rotary operating mechanism. This insures that a sample may be effectively isolated between a mandrel and cylinder with there being no danger of inadvertent mandrel movement which would tend to open the chamber.

The stepped or progressively enlarged nature of the sample chamber tends to gradualize the enlargement of the communicating flow path extending between the passage means 23 and the main, large portion of the sample chamber. This stepped configuration is believed to minimize the possibility of excessive phase separation occurring within the sample fluid as it moves through this transition zone.

The sample discharging assemblies 48 and 62 each enables operator manipulations to be performed with the tool cylinder providing a barrier, partially shielding an operator from the fluid outlet locations.

In the context of the overall advantageous novelty, the shielding provided by the cap 93 and sleeve 90 and the locking effect provided by the threaded coupjling means 42 and 35 tends to make the control mandrel virtually immune to inadvertent movements. Neither the pressure of flowing fluids nor inadvertent axial force will serve to dislodge the mandrel from a fixed control position.

In the context of the overall novelty, the sequential axial movements of the mandrel, which serve to repeatedly open and close the annular sample chamber, insures that the testing operation may be conducted without incurring likelihood of separating threaded conduit string portions.

The combination of seals, recesses and ports, of the control system provide virtually fool-proof control valve operation.

The rotary nature of the mandrel wall, which defines the inner wall of the sample chamber, avoids vulnerability to seal scouring which might exist where purely linear mandrel movement was involved.

While, in describing the invention, reference has been made to a preferred embodiment, those familiar with this disclosure and skilled in the testing art, may envision additions, deletions, substitutions or modifications which would fall within the purview of the invention as defined in the appended claims.

We claim:

1. A well fluid sampling apparatus, said apparatus when disposed in a vertical well comprising:
   cylinder means;
   mandrel means movably mounted within said cylinder means;
   rotary operating means adapted to be connected to a conduit string and operable, in response to rotation of said conduit string, to induce axial movement of said mandrel means within said cylinder means;
   wall means defining an annular sample chamber interposed radially between said cylinder means and mandrel means and having upper and lower ends;
   first passage means disposed beneath said annular sample chamber and adapted to communicate with well fluid and communicate with said annular sample chamber;
   second passage means disposed above said annular sample chamber and adapted to communicate with said annular sample chamber and communicate with the interior of said conduit string supporting said apparatus;
   control means operable in response to a first axial positioning of said mandrel means at first position within said cylinder means to permit a flow of well fluid from said first passage means through said annular sample chamber and into said second passage means; and
   additional control means operable in response to another positioning of said mandrel means at another position within said cylinder means, displaced in an axal direction from said first position of said mandrel means, to block fluid flow from said first passage means through said annular sample chamber and into said second passage means and seal said upper and lower ends of said annular sample chamber and entrap well fluid therebetween;
   said rotary operating means including threaded locking means operable to prevent movement of said mandrel means in response to entirely axial force applied thereto and lock said additional central means, thereby fixedly maintaining the sealing of the upper and lower ends of said sample chamber.

2. A well fluid sampling apparatus, said apparatus when disposed in a vertical well comprising:
   cylinder means;
   mandrel means movably mounted within said cylinder means, said mandrel means having a longitudinally extending passage including open, upper and lower ends;
   rotary operating means adapted to be connected to a conduit string and operable, in response to rotation of said conduit string, to induce axial movement of said mandrel means within said cylinder means accompanied by rotation of said mandrel means;
   wall means defining an annular sample chamber interposed radially between said cylinder means and mandrel means and having upper and lower ends, said wall means including:
      fixed wall means carried by said cylinder means; and rotatable wall means carried by and rotatable with said mandrel means;

first passage means disposed beneath said annular sample chamber and adapted to communicate with well fluid and communicate with the lower end of said annular sample chamber, second passage means disposed above said annular sample chamber and adapted to communicate with the upper end of said annular sample chamber and communicate with said mandrel means passage and the interior of said conduit string supporting said apparatus;

first control means operable in response to a first axial positioning of said mandrel means at a first position within said cylinder means to permit a flow of well fluid from said first passage means through said annular sample chamber and into said second passage means;

second control means operable in response to a second axial positioning of said mandrel at a second position within said cylinder means, displaced in one axial direction from said first position, to block the flow of well fluid from said first passage means through said annular sample chamber and into said second passage means;

third control means operable in response to a third axial positioning of said mandrel means at a third position within said cylinder means, displaced in said one axial direction from said second postion, to allow a flow of well fluid from said first passage means through said annular sample chamber and into said second passage means; and fourth control means operable in response to a fourth positioning of said mandrel means at a fourth position with said cylinder means, displaced in one axial direction from said third position of said mandrel means, to block fluid flow from said first passage means through said annular sample chamber and into said second passage means and seal said upper and lower ends of said annular sample chamber and entrap well fluid therebetween.

3. A well fluid sampling apparatus, said apparatus when disposed in a vertical well comprising:

cylinder means;

mandrel means movably mounted within said cylinder means, said mandrel means having a longitudinally extending passage including open, upper and lower ends;

rotary operating means adapted to be connected to a conduit string and operable, in response to rotation of said conduit string, to induce axial movement of said mandrel means within said cylinder means accompanied by rotation of said mandrel means;

wall means defining an annular sample chamber interposed radially between said cylinder means and mandrel means and having upper and lower ends;

first passage means disposed beneath said annular sample chamber and adapted to communicate with well fluid and communicate with the lower end of said annular sample chamber;

second passage means disposed above said annular sample chamber and adapted to communicate with the upper end of said annular sample chamber and communicate with said mandrel means passage and the interior of said conduit string supporting said apparatus;

first control means operable in response to a first axial positioning of said mandrel means at a first position within said cylinder means to permit a flow of well fluid from said first passage means through annular sample chamber and into said second passage means;

second control means operable in response to a second axial positioning of said mandrel at a second position within said cylinder means, displaced in one axial direction from said first position, to block the flow of well fluid from said first passage means through said annular sample chamber and into said second passage means;

third control means operable in response to a third axial positioning of said mandrel means at a third position within said cylinder means, displaced in said one axial direction from said second position, to allow a flow of well fluid from said first passage means through said annular sample chamber and into said second passage means;

fourth control means operable in response to a fourth positioning of said mandrel means at a fourth position within said cylinder means, displaced in one axial direction from said third position of said mandrel means, to block fluid flow from said first passage means through said annular sample chamber and into said second passage means and seal said upper and lower ends of said annular sample chamber and entrap well fluid therebetween;

cylindrical wall means carried by said cylinder means and telescopingly receiving the lower end of said mandrel means; and detachable cap means closing and sealing the lower end of said cylinder wall means and isolating said mandrel means from an upper flow of well fluid through said first passage means.

4. A well fluid sampling apparatus, said apparatus when disposed in a vertical well comprising:

cylinder means;

mandrel means movably mounted within said cylinder means, said mandrel means having a longitudinally extending passage including open, upper and lower ends;

rotary operating means adapted to be connected to a conduit string and operable, in response to rotation of said conduit string, to induce axial movement of said mandrel means within said cylinder means accompanied by rotation of said mandrel means;

wall means defining an annular sample chamber interposed radially between said cylinder means and mandrel means and having upper and lower ends;

first passage means disposed beneath said annular sample chamber and adapted to communicate with well fluid and communicate with the lower end of said annular sample chamber;

second passage means disposed above said annular sample chamber and adapted to communicate with the upper end of said annular sample chamber and communicate with said mandrel means passage and the interior of said conduit string supporting said apparatus;

first control means operable in response to a first axial positioning of said mandrel means at a first position within said cylinder means to permit a flow of well fluid from said first passage means through said annular sample chamber and into said second passage means;

said first control means including:
  first port means carried by said cylinder means and providing fluid communication between said first passage means and the lower end of said annular sample chamber,
  second port means carried by said cylinder means and communicating with an upper end of said annular sample chamber,
  a first annular recess formed on the outer periphery of said mandrel means and communicating with said second port means, and
  third port means carried by said mandrel means and providing fluid communication between said first annular recess and said second passage means, second control means operable in response to a second axial positioning of said mandrel at a second position within said cylinder means, displaced in one axial direction from said first position, to block the flow of well fluid from said first passage means through said annular sample chamber and into said second passage means;

said second control means including:
first seal means carried by said mandrel means and positioned to block fluid communication between said second port means and said first annular recess, third control means operable in response to a third axial positioning of said mandrel means at a third position within said cylinder means, displaced in said one axial direction from said second position, to allow a flow of well fluid from said first passage means through said annular sample chamber and into said second passage means; and said third control means including:
a second annular recess formed on the outer periphery of said mandrel means, with said first seal means being interposed axially between said first and second annular recess,
fourth port means carried by said mandrel means and providing fluid communication between said second annular recess and said second passage means, with said second port means providing fluid communication between said second annular recess and the upper end of said annular sample chamber, and with said first port means providing fluid communication between said first passage means and the lower end of said annular sample chamber, fourth control means operable in response to a fourth positioning of said mandrel means at a fourth position within said cylinder means, displaced in one axial direction from said third position of said mandrel means, to block fluid flow from said first passage means through said annular sample chamber and into said second passage means and seal said upper and lower ends of said annular sample chamber and entrap well fluid therebetween;

said fourth control means including:
second seal means positioned to block fluid communication between said second port means and said first and second annular recesses and thereby close said second port means, with said fourth port means being interposed axially between said first and second seal means,
third seal means carried by said mandrel means and positioned to block fluid communication between said first port means and said lower end of said annular sample chamber and thereby close said first port means,
said second seal means being operable, in response to axial movement of said mandrel means within said cylinder means, to close said second port means prior to said closing of said first port means by said third seal means.

5. A well fluid sampling apparatus, said apparatus when disposed in a vertical well comprising:
cylinder means;
mandrel means movably mounted within said cylinder means, said mandrel means having a longitudinally extending passage including open, upper and lower ends;
rotary operating means adapted to be connected to a conduit string and operable, in response to rotation of said conduit string, to induce axial movement of said mandrel means within said cylinder means accompanied by rotation of said mandrel means;
wall means defining an annular sample chamber interposed radially between said cylinder means and mandrel means and having upper and lower ends;
first passage means disposed beneath said annular sample chamber and adapted to communicate with well fluid and communicate with the lower end of said annular sample chamber;
second passage means disposed above said annular sample chamber and adapted to communicate with the upper end of said annular sample chamber and communicate with said mandrel means passage and the interior of said conduit string supporting said apparatus;

said annular sample chamber including:
a first annular portion adjacent said first passage means of relatively small cross sectional area,
a second annular portion communicating and contiguous with, and displaced axially above, said first annular portion and having a cross sectional area of intermediate size, greater than that of said first annular portion, and
a third annular portion communicating and contiguous with, and displaced axially above, said second annular portion and having a relatively large cross sectional area, greater than that of said second annular portion;

first control means operable in response to a first axial positioning of said mandrel means at a first position within said cylinder means to permit a flow of well fluid from said first passage means through said annular sample chamber and into said second passage means;

second control means operable in response to a second axial positioning of said mandrel at a second position within said cylinder means, displaced in one axial direction from said first position, to block the flow of well fluid from said first passage means through said annular sample chamber and into said second passage means;

third control means operable in response to a third axial positioning of said mandrel means at a third position within said cylinder means, displaced in said one axial direction from said second position, to allow a flow of well fluid from said first passage means through said annular sample chamber and into said second passage means; and fourth control means operable in response to a fourth positioning of said mandrel means at a fourth position within said cylinder means, displaced in one axial direction from said third position of said mandrel means, to block fluid flow from said first passage means through said annular sample chamber and into said second passage means and seal said upper and lower ends of said annular sample chamber and entrap well fluid therebetween.

6. A well fluid sampling apparatus, said apparatus when disposed in a vertical well comprising:
cylinder means;
mandrel means movably mounted within said cylinder means, said mandrel means having a longitudinally extending passage including open, upper and lower ends;
rotary operating means adapted to be connected to a conduit string and operable, in response to rotation of said conduit string, to induce axial movement of said mandrel means within said cylinder means accompanied by rotation of said mandrel means;
said rotary operating means comprising:
a spindle journaled in the upper end of said cylinder means and connected to said conduit string for rotary movement therewith,
a female, threaded coupling fixedly positioned within and carried by said cylinder means,
a male, threaded coupling fixedly positioned on the exterior of and carried by said mandrel means and threadably engaged with said female threaded coupling,
spline joint means interconnecting said spindle means and said mandrel means and operable to enable rotary movement to be transmitted from said spindle to said mandrel means and cause said mandrel means to rotate, with threaded cooperation between said male and female couplings inducing axial movement of said mandrel means within said cylinder means, and sleeve means detachably mounted within said cylinder means, said sleeve means telescopingly receiving and shielding said male coupling means;

wall means defining an annular sample chamber interposed radially between said cylinder means and mandrel means and having upper and lower ends;

first passage means disposed beneath said annular sample chamber and adapted to communicate with well fluid and communicate with the lower end of said annular sample chamber;

second passage means disposed above said annular sample chamber and adapted to communicate with the upper end of said annular sample chamber and communicate with said mandrel means passage and the interior of said conduit string supporting said apparatus;

first control means operable in response to a first axial positioning of said mandrel means at a first position within said cylinder means to permit a flow of well fluid from said first passage means through said annular sample chamber and into said passage means;

second control means operable in response to a second axial positioning of said mandrel at a second position within said cylinder means, displaced in one axial direction from said first position, to block the flow of well fluid from said first passage means through said annular sample chamber and into said second passage means;

third control means operable in response to a third axial positioning of said mandrel means at a third position within said cylinder means, displaced in said one axial directon from said second position, to allow a flow of well fluid from said first passage means through said annular sample chamber and into said second passage means; and fourth control means operable in response to a fourth positioning of said mandrel means at a fourth position within said cylinder means, displaced in one axial direction from said third positon of said mandrel means, to block flud flow from said first passage means through said annular sample chamber and into said second passage means and seal said upper and lower ends of said annular sample chamber and entrap well fluid therebetween;

said male and female threaded couplings defining threaded locking means operable to prevent movement of said mandrel means in response to entirely axial force applied thereto and lock said fourth control means, thereby fixedly maintaining the sealing of the upper and lower ends of said sample chamber.

7. A well fluid sampling apparatus, said apparatus when disposed in a vertical well comprising:

cylinder means;

mandrel means movably mounted within said cylinder means, said mandrel means having a longitudinally extending passage including open, upper and lower ends;

rotary operating means adapted to be connected to a conduit string and operable, in response to rotation of said conduit string, to induce axial movement of said mandrel means within said cylinder means accompanied by rotation of said mandrel means;

wall means defining an annular sample chamber interposed radially between said cylinder means and mandrel means and having upper and lower ends;

first passage means disposed beneath said annular sample chamber and adapted to communicate with well fluid and communicate with the lower end of said annular sample chamber;

second passage means disposed above said annular sample chamber and adapted to communicate with the upper end of said annular sample chamber and communicate with said mandrel means passage and the interior of said conduit string supporting said apparatus;

first control means operable in response to a first axial positioning of said mandrel means at a first position within said cylinder means to permit a flow of well fluid from said first passage means through said annular sample chamber and into said second passage means;

second control means operable in response to a second axial positioning of said mandrel at a second position within said cylinder means, displaced in one axial direction from said first position, to block the flow of well fluid from said first passage means through said annular sample chamber and into said second passage means;

third control means operable in response to a third axial positioning of said mandrel means at a third position within said cylinder means, displaced in said one axial direction from said second position, to allow a flow of well fluid from said first passage means through said annular sample chamber and into said second passage means;

fourth control means operable in response to a fourth positioning of said mandrel means at a fourth position within said cylinder means, displaced in one axial direction from said third position of said mandrel means, to block fluid flow from said first passage means through said annular sample chamber and into said second passage means and seal said upper and lower ends of said annular sample chamber and entrap well fluid therebetween;

first, sample fluid, passage means formed in said cylinder means, said first, sample fluid, passage means including:

a first passage portion extending generally outwardly of and communicating with a lower end of said annular sample chamber, a second passage portion extending generally perpendicular to said first passage portion and to a radius of said cylinder means, first spool valve means positioned in said second passage portion and operable to control fluid flow between said first passage portion and said second passage portion, first valve operating means projecting from said spool valve means to a first zone on the exterior of said cylinder means, a third longitudinal passage portion inclined relative to, extending from, and communicating with said second passage portion and having an outlet at a second zone on the exterior of said cylinder means, circumferentially displaced from said first zone, said first spool valve means being operable to selectively control fluid flow between said first passage portion and said third passage portion, said second and third passage portions being substantially aligned with a first plane extending perpendicular to the longitudinal axis of said cylinder means; and second, sample fluid, passage means formed in said cylinder means, said second, sample fluid, passage means including:

a fourth passage portion extending generally outwardly of and communicating with an upper end of said annular sample chamber, a fifth passage portion extending generally perpendicular to a radius of said cylinder means, second spool valve means positioned in said fifth passage portion and operable to control fluid flow between said fourth passage portion and said fifth portion, second valve operating means projecting from said spool valve means to a third zone on the exterior of said cylinder means, a sixth longitudinal passage portion inclined relative to, extending from, and communicating with said fifth passage portion and having an outlet at a fourth zone on the exterior of said cylinder means, circumferentially displaced from said third zone, said second spool valve means being operable to selectively control fluid flow between said fourth passage portion and said sixth passage portion, said fifth and sixth passage portions being substantially aligned with a second plane extending perpendicular to the longitudinal axis of said cylinder means and displaced axially from said first plane of said first, sample fluid, passage means.

8. A well fluid sampling apparatus, said apparatus when disposed in a vertical well comprising:

cylinder means;

mandrel means movably mounted within said cylinder means;

rotary operating means adapted to be connected to a conduit string and operable, in response to rotation on said conduit string, to induce axial movement of said mandrel means within said cylinder means;

wall means defining an annular sample chamber interposed radially between said cylinder means and mandrel means and having upper and lower ends;

said annular sample chamber including:

a first annular portion adjacent said first passage means of relatively small cross sectional area, a second annular portion communicating and contiguous with, and displaced axially above, said first annular portion and having a cross sectional area of intermediate size, greater than that of said first annular portion, and a third annular portion communicating and contiguous with, and displaced axially above, said second annular portion and having a relatively large cross sectional area, greater than that of said second annular portion;

first passage means disposed beneath said annular sample chamber and adapted to communicate with well fluid and communicate with said annular sample chamber;

second passage means disposed above said annular sample chamber and adapted to communicate with said annular sample chamber and communicate with the interior of said conduit string supporting said apparatus;

control means operable in response to a first axial positioning of said mandrel means at first position within said cylinder means to permit a flow of well fluid from said first passage means through said annular sample chamber and into said second passage means;

additional control means operable in response to another positioning of said mandrel means at another position within said cylinder means, displaced in an axial direction from said first position of said mandrel means, to block fluid flow from said first passage means through said annular sample chamber and into said second passage means and seal said upper and lower ends of said annular sample chamber and entrap well fluid therebetween;

cylindrical wall means carried by said cylinder means and telescopingly receiving the lower end of said mandrel means; and cap means closing and sealing the lower end of said cylindrical wall means and isolating said mandrel means from an upper flow of well fluid through said first passage means.

9. A well fluid sampling apparatus, said apparatus when disposed in a vertical well comprising:

cylinder means;

mandrel means movably mounted within said cylinder means;

operating means adapted to be connected to a conduit string and operable, in response to movement of said conduit string, to induce axial movement of said mandrel means within said cylinder means;

wall means defining an annular sample chamber interposed radially between said cylinder means and mandrel means and having upper and lower ends;

said annular sample chamber including:

a first annular portion adjacent said first passage means of relatively small cross sectional area, a second annular portion communicating and contiguous with, and displaced axially above, said first annular portion and having a cross sectional area of intermediate size, greater than that of said first annular portion, and a third annular portion communicating and contiguous with, and displaced axially above, said second annular portion and having a relatively large cross sectional area, greater than that of said second annular portion;

first passage means disposed beneath said annular sample chamber and adapted to communicate with well fluid and communicate with said annular sample chamber;

second passage means disposed above said annular sample chamber and adapted to communicate with said annular sample chamber and communicate with the interior of said conduit string supporting said apparatus;

control means operable in response to a first axial positioning of said mandrel means at first position within said cylinder means to permit a flow of well fluid from said first passage means through said annular sample chamber and into said second passage means;

additional control means operable in response to another positioning of said mandrel means at another position within said cylinder means, displaced in an axial direction from said first position of said mandrel means, to block fluid flow from said first passage means through said annular sample chamber and into said second passage means and seal said upper and lower ends of said annular sample chamber and entrap well fluid therebetween;

first, sample fluid, passage means formed in said cylinder means, said first, sample fluid, passage means including:

a first passage portion extending generally outwardly of and communicating with a lower end of said annular sample chamber, a second passage portion extending generally perpendicular to said first passage portion and to a radius of said cylinder means, first spool valve means positioned in said second passage portion and operable to control fluid flow between said first passage portion and said second passage portion, first valve operating means projecting from said spool valve means to a first zone on the exterior of said cylinder means, a third longitudinal passage portion inclined relative to, extending from, and communicating with said second passage portion and having an outlet at a second zone on the exterior of said cylinder means, circumferentially displaced from said first zone, said first spool valve means being operable to selectively control fluid flow between said first passage portion and said third passage portion, said second and third passage portions being substantially aligned with a first plane extending perpendicular to the longitudinal axis of said cylinder means; and a second, sample fluid, passage means fromed in said cylinder means, said second, sample fluid, passage means including:
- a fourth passage portion extending generally outwardly of and communicating with an upper end of said annular sample chamber,
- a fifth passage portion extending generally perpendicular to a radius of said cylinder means,
- second spool valve means positioned in said fifth passage portion and operable to control fluid flow between said fourth passage portion and said fifth portion,
- second valve operating means projecting from said spool valve means to a third zone on the exterior of said cylinder means,
- a sixth longitudinal passage portion inclined relative to, extending from, and communicating with said fifth passage portion and having an outlet at a fourth zone on the exterior of said cylinder means, circumferentially displaced from said third zone,
- said second spool valve means being operable to selectively control fluid flow between said fourth passage portion and said sixth passage portion,
- said fifth and sixth passage portions being substantially aligned with a second plane extending perpendicular to the longitudinal axis of said cylinder means and displaced axially from said first plane of said first, sample fluid, passage means.

10. A well fluid sampling apparatus, said apparatus when disposed in a vertical well comprising:

wall means defining an annular sample chamber;
cylinder means encircling said annular sample chamber;
first passage means disposed beneath said annular sample chamber and adapted to communicate with well fluid and communicate with said annular sample chamber;
second passage means disposed above said annular sample chamber and adapted to communicate with said annular sample chamber and communicate with the interior of a conduit string supporting said apparatus;
control means operable to permit a flow of well fluid from said first passage means through said annular sample chamber and into said second passage means;
additional control means operable to block fluid flow from said first passage means through said annular sample chamber and into said second passage means, to seal said annular sample chamber, and to entrap well fluid therein;
sample fluid, passage means formed in said cylinder means, said sample fluid, passage means including:
- a first passage portion extending generally outwardly of and communicating with said annular sample chamber,
- a second passage portion extending generally transversely of said first passage portion and transversely of a radius of said cylinder means,
- spool valve means positioned in said second passage portion and operable to control fluid flow between said first passage portion and said second passage portion,
- valve operating means projecting from said spool valve means to a first zone on the exterior of said cylinder means, and
- a third longitudinal passage portion having an outlet at a second zone on the exterior of said cylinder means, circumferentially displaced from said first zone,
- said spool valve means being operable to selectively control fluid flow between said first passage portion and said third passage portion; and operator shielding means defined by a peripheral portion of said cylinder means extending circumferentially between said first and second zones.

References Cited

UNITED STATES PATENTS

| 2,751,011 | 6/1956 | Johnston | 166—162 |
| 2,978,046 | 4/1961 | True | 166—162 |
| 3,291,219 | 12/1966 | Nutter | 166—162 |
| 3,327,781 | 6/1967 | Nutter | 166—162 |

JAMES A. LEPPINK, Primary Examiner

U.S. Cl. X.R.

166—152, 169